(12) United States Patent
Stefanov et al.

(10) Patent No.: US 7,581,862 B2
(45) Date of Patent: Sep. 1, 2009

(54) LIGHT GUIDE ELEMENT AND LIGHT UNIT WITH LIGHT GUIDE ELEMENT

(75) Inventors: Emil Stefanov, Esslingen (DE); Stephanie Specht, Stuttgart (DE)

(73) Assignee: odelo GmbH, Schwaikheim (DE)

( * ) Notice: Subject to any disclaimer, the term of this patent is extended or adjusted under 35 U.S.C. 154(b) by 0 days.

(21) Appl. No.: 12/098,023

(22) Filed: Apr. 4, 2008

(65) Prior Publication Data

US 2008/0273338 A1   Nov. 6, 2008

(30) Foreign Application Priority Data

Apr. 5, 2007   (DE) .................... 10 2007 016 923

(51) Int. Cl.
*F21V 8/00* (2006.01)
(52) U.S. Cl. .................... 362/555; 362/551; 385/146
(58) Field of Classification Search ................ 362/551, 362/555, 558; 385/146
See application file for complete search history.

(56) References Cited

U.S. PATENT DOCUMENTS

| | | | | | |
|---|---|---|---|---|---|
| 4,576,436 A | * | 3/1986 | Daniel | .................... | 385/25 |
| 4,947,292 A | * | 8/1990 | Vlah | .................... | 362/551 |
| 5,581,683 A | * | 12/1996 | Bertignoll et al. | .................... | 385/146 |
| 7,147,356 B2 | * | 12/2006 | Tamaki | .................... | 362/551 |
| 2005/0243570 A1 | | 11/2005 | Chaves et al. | | |
| 2006/0083013 A1 | | 4/2006 | Wanninger et al. | | |

* cited by examiner

*Primary Examiner*—Laura Tso
(74) *Attorney, Agent, or Firm*—Reising Ethington P.C.

(57) ABSTRACT

The invention concerns a light guide element whose cross-sectional surface widens continuously at least in areas from a light inlet surface to a light outlet surface, as well as a light unit with at least one LED as light source and with a light guide element. For this purpose the light guide element includes at least one area with a curved directrix, in which the curvature of the directrix in this area is constant or which the curvature of the directrix in this area diminishes with increasing cross section of the light guide element.

Figure 3:
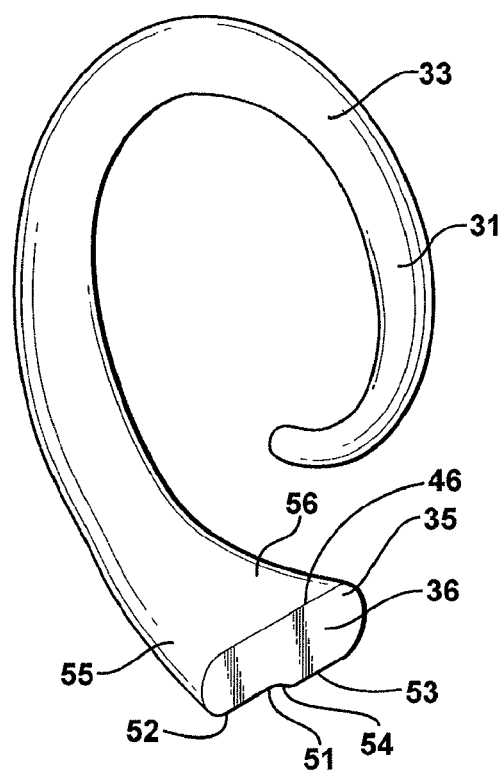

With the present invention the light guide element and a light unit are developed, which permits a soft transition of illumination intensity in a sharply delimited light-dark boundary of the illuminated area on the other edges.

10 Claims, 5 Drawing Sheets

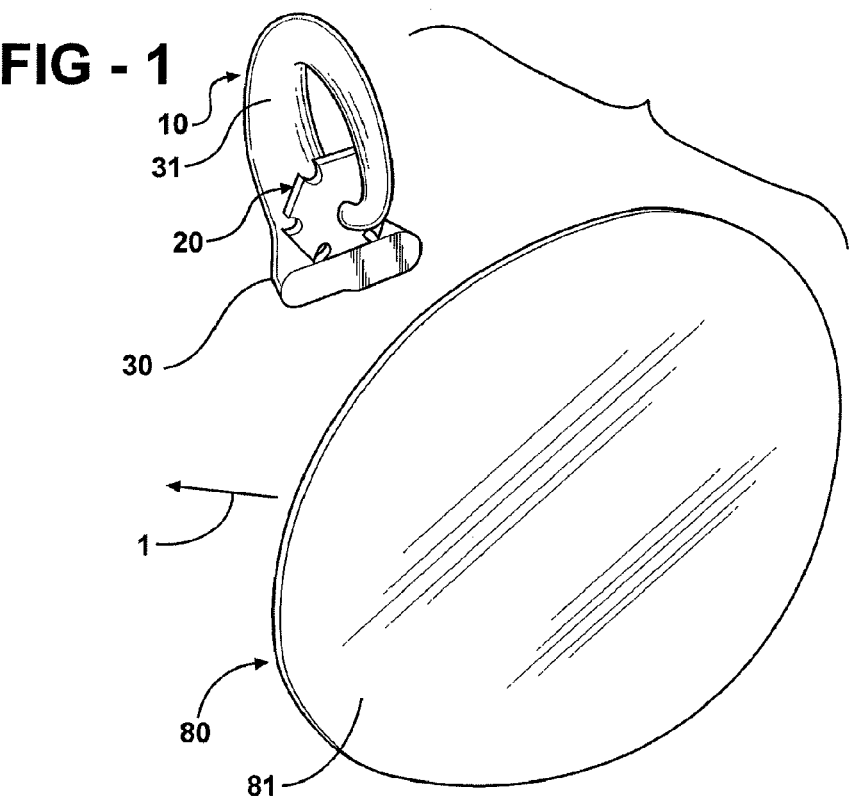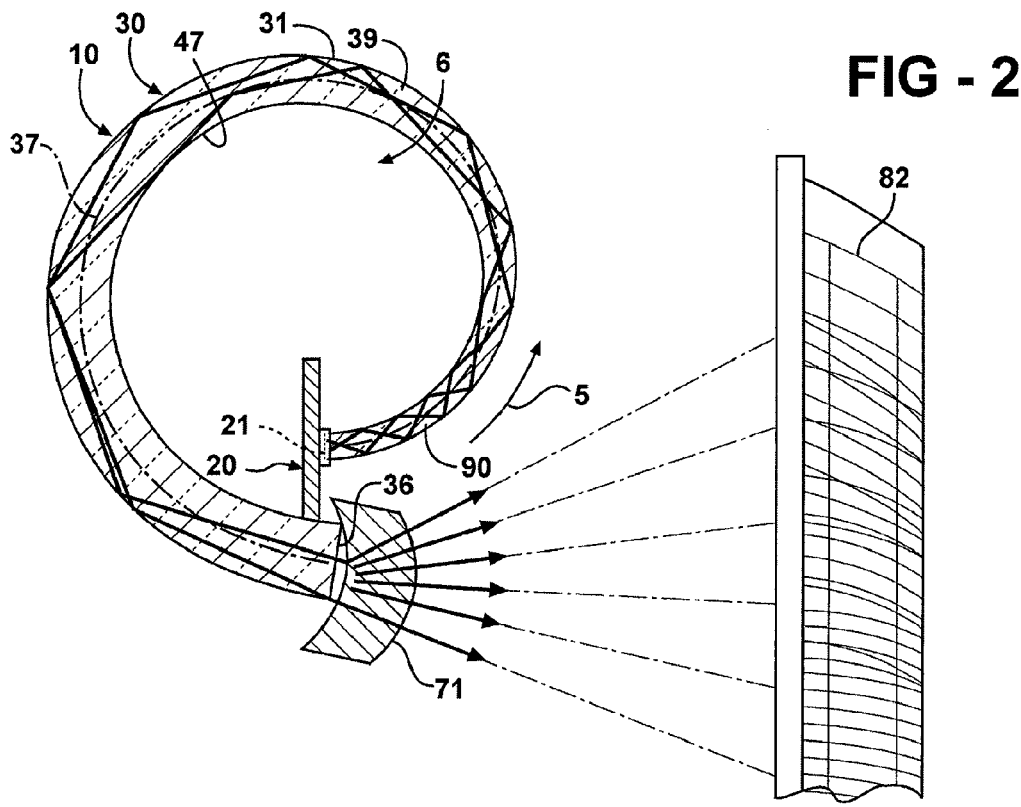

LIGHT GUIDE ELEMENT AND LIGHT UNIT WITH LIGHT GUIDE ELEMENT

The invention concerns a light guide element whose cross-sectional surface continuously widens from the light inlet surface to light outlet surface at least in areas as well a light unit with at least one luminescent diode as light source and with a light guide element.

Light units that are used, for example, in projection vehicle headlights require high light output or luminance. White LED light sources, however, still have limited luminance and therefore require a large active source or chip surface in order to generate the required light output. Several light-emitting diodes are therefore often used as light sources. In order to achieve the required illumination intensity for operation, a light intensity or luminance increase is already introduced to the optical system, the so-called primary optics, optically connected after the light source. For this purpose an object intermediate plane or a virtual image with a shaped cutoff, that is a section of the upper light-dark boundary visible on a measurement wall, is imaged.

The use of diaphragms has a negative effect on efficient light distribution of optical systems. A light bundle that is cast onto the roadway, for example, by means of an imaging secondary optics is therefore formed with a highly transparent light guide element.

A light unit with such a light guide element is known from DE 10 2005 017 528 A1. During operation of the light unit, hard transitions of illumination intensity to the non-illuminated area form on all edges of the illuminated area.

The problem underlying the present invention is therefore to develop a light guide element and light unit that permits a soft transition of illumination intensity in a sharply delimited light-dark boundary of the illuminated area on the other edges.

This problem is solved with the features of the main claim. For this purpose the light guide element includes at least one area with a curved directrix in which the curvature of the directrix in this area is constant or in which the curvature of the directrix diminishes with increasing cross section of light guide element in this area. Any line that intersects the light outlet surface penetrates a limitation surface of the light guide element outside the light outlet surface. In addition, the longest surface line bordering the light guide element in the curved area is longer than the difference from pi and double the largest critical angle of total reflection of the material of the light guide element relative to the material or materials of the surroundings adjacent to the light guide element divided by the maximum actual curvature of the mentioned surface line of the light guide element.

With such a structure of the light guide element and the light unit there are no light fractions that penetrate directly and without reflection through the light guide element. The entire light is reflected on the interfaces of the light guide element. The light is mixed so that an illumination intensity distribution generated by the secondary optics is independent of the light intensity distribution of the light source. All light-dark transitions bordering the illuminated area are therefore controlled by the primary optics.

Additional details of the invention are apparent from the dependent claims and the following description of schematically depicted variants.

Figure 4:
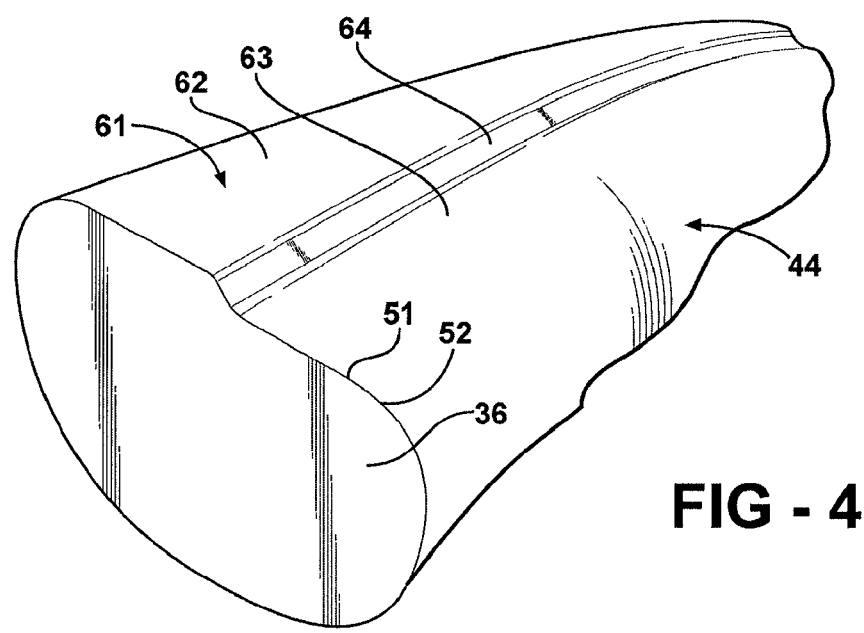
Figure 5:
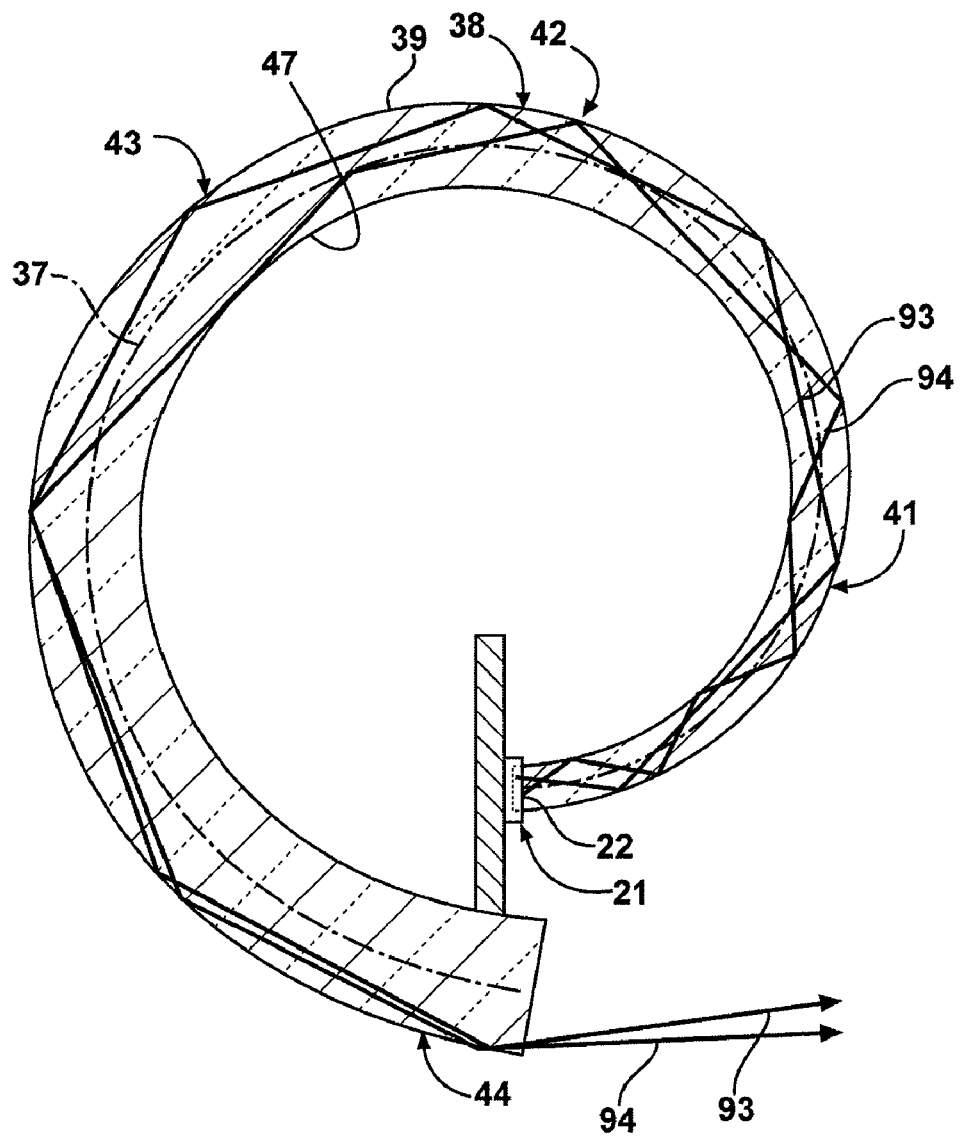
Figure 6:
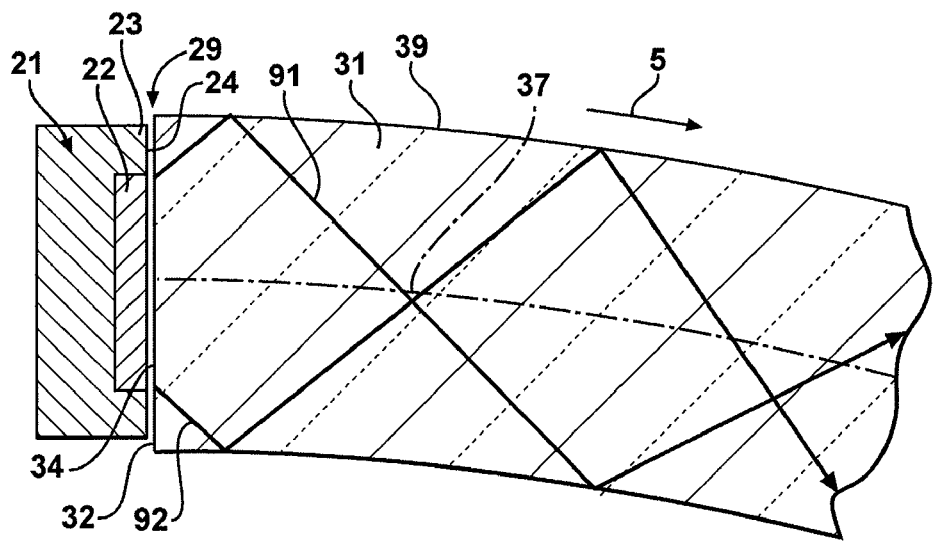
Figure 7:
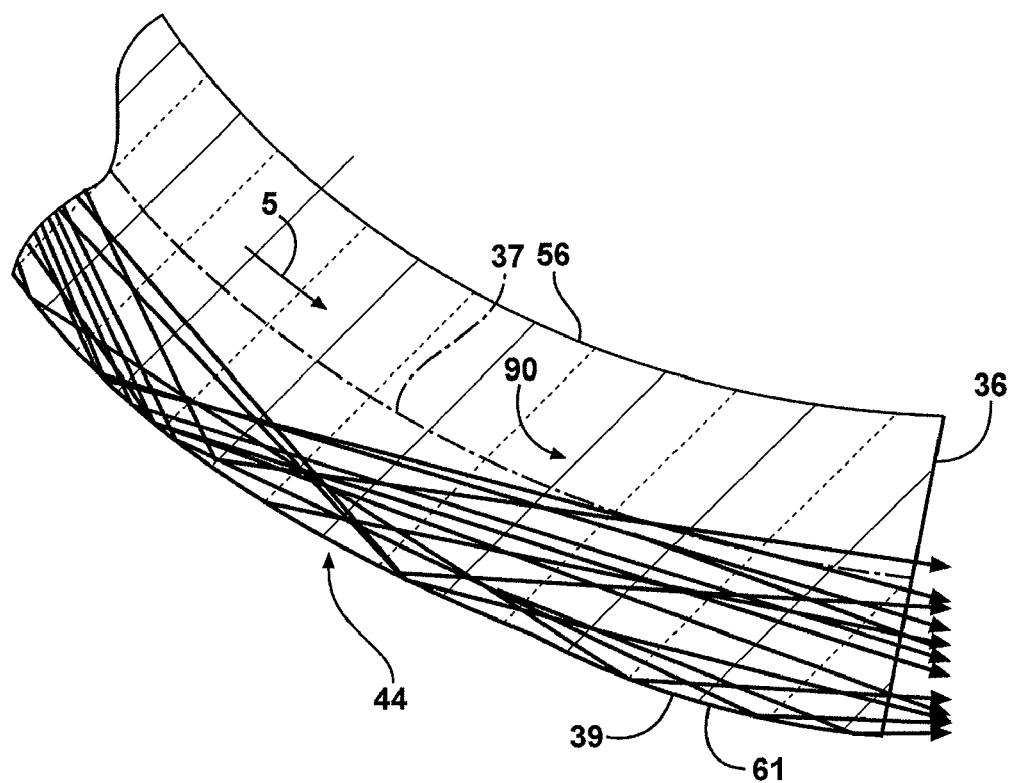
Figure 8:
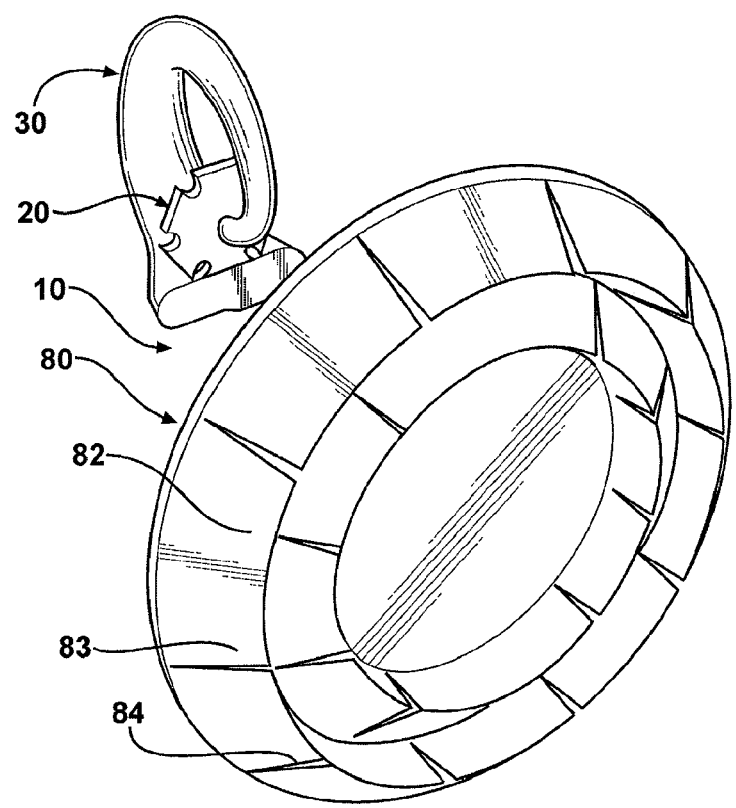
Figure 9:
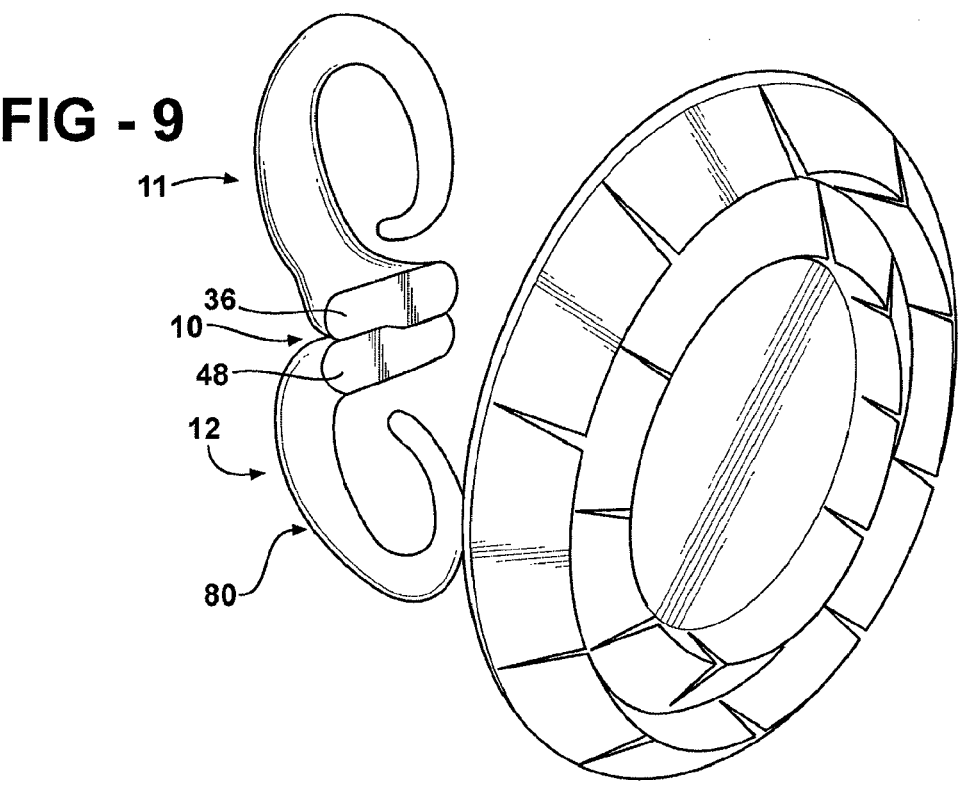

FIG. 1: Dimetric view of a light unit;
FIG. 2: Side view of a light unit;
FIG. 3: Dimetric view of a light guide element;
FIG. 4: View of the light outlet area;
FIG. 5: Longitudinal view of the light guide element with light source;
FIG. 6: Detail of the light inlet area;
FIG. 7: Detail of the light outlet area;
FIG. 8: Light unit with a Fresnel lens as secondary lens;
FIG. 9: Combined light unit for low beam and high beam.

FIG. 1 shows a dimetric view and FIG. 2 a side view of a light unit (10). These light units (10) are used, for example, in a headlight of a vehicle. In these practical examples they each include a light source (20), a primary optics (30) with a light guide element (31) and a secondary optics (80) with a secondary lens (81; 82). The light guide element (31) in the depiction in FIG. 2 was shown in a longitudinal section. The primary optics (30) in this depiction also includes a primary lens (71) optically connected after the light guide element (31).

The light source (20) in these practical examples includes a luminescent diode, for example, an LED (21) with a light-emitting chip (22). The LED (21) can also include several light-emitting chips (22) which are arranged, for example, in a square. The light-emitting chip (22), for example, is a Lambert radiator that emits light in a half-space. The LED (21) has a cylindrical light distribution element (23), cf. FIG. 6. This does not protrude above chip (22) in this practical example in a direction normal to the light-emitting chip (22). The light distribution element (23), however, can also protrude beyond the chip (22), for example, 1.6 millimeters in the light propagation direction (5). The light distribution element (23) can also be designed cuboid with or without rounded corners, drop-like, etc. The main light outlet surface (24), for example, is parallel to the light-emitting chip (22).

The individual LED (21) generates a light output of 400 lumen. Instead of an individual LED (21), the light source (20) can also include several LEDs (21). These can be white and/or RGB LEDs. The emission angle of the individual LED (21) can be narrower than 180°, for example, the light output can be bundled to an outlet angle of 150° or 120°.

A narrow air gap (29) exists in the practical examples between the light distribution element (23) of the LED (21) and the light guide element (31), for example, with a width less than five-tenths of a millimeter. This air gap (29) is part of the surroundings (1) bordering the light guide element (31). The light distribution element (24) can also lie against light distribution element (31). The main light outlet surface (24) of the light distribution element (23) and the end surface (32) of the light guide element (31) are arranged parallel to each other. The gap (29) can also be filled with a material whose refractive index is higher than the refractive index of air, for example, 1.1.

The light guide element, cf. FIG. 3, consists of a thermoplastic material, for example, polymethacrylic acid methyl ester (PMMA), polycarbonate (PC) or modified polymethyl methacrylimide (PMMI). The material of the light guide element (31) designed, for example, as a solid element has an optical refractive index of 1.49 during use of PMMA. The outer surface (33) of light guide element (31) in the practical examples directly borders the air surrounding the light guide element (31). The surroundings (1) of the light guide element (31) therefore have a refractive index of 1 in these practical examples. The light guide element (31) can also be enclosed by a second element having a lower refractive index than light guide element (31). The light guide element (31) can also include a coating, for example, mirroring, on its outer surface (33).

The light guide element (31) in the practical examples depicted in FIGS. 1 to 7 has the shape of a spiral, for example, an Archimedes spiral that widens from the light source (20) to secondary optics (80). The end surface (32) of the light guide element (31) facing the light source (20) includes a light inlet surface (34) and the end surface (35) facing the secondary optics (80) includes a light outlet surface (36). The light inlet surface (34) and the light outlet surface (36) are the optically utilized areas of the corresponding end surfaces (32, 35) and can be smaller than the end surfaces (32, 35). The light inlet surface (34) and light outlet surface (36) lie in planes that enclose an angle of 10° with each other.

The light guide elements (31) depicted in FIGS. 1 to 7 have a curved directrix (37), which corresponds to the geometric center line of the light guide element (31). The light guide element (31) enclosing the directrix (37) has an outer surface line (39). This surface line (39) is the longest surface line of the light guide element (31). It is the line that connects the points of the outer surface (33) with the smallest curvature in the light propagation direction (5).

The directrix (37) and the surface line (39) in the depicted practical examples lie together in one plane. The curvature of directrix (37) and the curvature of surface line (39) have a constant center point. Both curvatures have no inflection point. They diminish here from the light inlet surface (34) to the light outlet surface (36), cf. FIGS. 2 and 5. The light guide element (31), however, can be constructed so that the directrix (37) and/or the surface line (39) do not lie in one plane. The spirals can thus be designed helical. The lines (37, 39) can also have different centers of curvature in sections. The directrix (37) of the light guide element (31) can have the shape of a circular arc section instead of the shape of a spiral. In this case the curvature of the directrix (37) is constant.

The light guide element (31) can have one or more areas with a straight directrix (37). Such an area then borders the light inlet surface (34).

The light inlet surface (34) and the light outlet surface (36) are arranged in the practical examples normal to a plane in which the directrix (37) lies. However, they can also be sloped to it. The light guide element (31), however, is constructed so that each line through the light inlet surface (34) penetrates the outer surface (33) of the light guide element (31) outside of the light outlet surface (36). Consequently, there is no light beam in the light unit (10) that penetrates the light guide element (31) from the light inlet surface (34) to the light outlet surface (36) without being reflected on the outer surface (33), the boundary surface (33) of the light guide element (31).

The directrix (37) and the surface line (39) of the light guide element (31) cover an angle of, for example, 360° in the practical examples. The angle covered by lines (37, 39) can also be smaller, for example, 180° or 190°. The length L of surface line (39) in this curved area (38) of light guide element (31) is longer than $2\times((pi/2)-\alpha)/KI_{max}$, in which $KI_{max}$ is the largest actual curvature of surface line (39) of light guide element (31). $\alpha$ denotes the critical angle of total reflection of the material of light guide element (31) relative to its adjacent surroundings (1). In a light guide element (31) made of PMMA, which is closed by air, this critical angle is 42.2°. With these values, at a maximal actual curvature of outer surface (33) of, say, $8\times10^{-3}$/millimeter the surface line (39) of light guide element (31) in the curved area (38) is longer than 208 millimeters. Consequently, each light beam total reflected in light guide element (31) is totally reflected at least once in the curved area (38) of light guide element (31).

The surface line (39) in the curved area (38) can be longer than the stated minimum length. The light guide element (31) can be designed so that a light beam is reflected four or five times. However, the absorption losses increase with the length of the light path in light guide element (31).

The outer surface line (39) has its greatest curvature in the curved area (38). In the practical examples the area of maximum curvature is adjacent to the light inlet surface (34). The radius of curvature of the surface line (39) there is seven times the diameter of the light inlet surface (34). Adjacent to the light outlet surface (36) the radius of curvature of the surface line is 12 times the diameter of the light inlet surface (34).

The minimal admissible radius of curvature of the light guide element (31) is determined by the maximal admissible curvature of the longest surface line (39). This maximal admissible curvature is the curvature of the surface line (39) at which each light beam entering the light inlet surface (34) is totally reflected in the light guide element (31) on the interfaces (33) of the light guide element (31). If this value is not surpassed, the condition for total reflection is met in the practical examples for the entire light guide element (31).

When a Lambert radiator is used as light source (20), the maximal admissible curvature $K_{max}$ is $K_{max}=(1-\tan(\alpha))/h$. In this formula h is the length of a light inlet surface (34) in a plane that this length and the curvature $K_{max}$ span. This plane, for example, is normal to the light inlet surface (34). The tangent of the total reflection critical angle a is obtained from the refractive indices $n_1$ of the light guide element (31) and $n_2$ of the surroundings (1) as $\tan(\alpha)=n_2/(n^2-n_2^2)^{1/2}$. In the practical examples depicted in FIGS. 1 to 7 with h=10 millimeters, $n_1=1.49$ and $n_2=1$ the maximal admissible curvature of the surface line (39) is $9.5\times10^{-3}$/millimeter. The minimal required radius of curvature of the surface line (39) is therefore 105 millimeters.

In the LED (21) assumed in the practical examples the light bundle (90) emitted from the light source (20) is theoretically bounded by beams (91, 92), which impinge on the light inlet surface (34) at 90° to the normal, cf. FIG. 6. These light beams (91, 92) are refracted in the present practical examples on entering the light guide element (31) perpendicular to the light inlet surface (34) at the impingement point, for example, at an angle of 42.2° to the normal on light inlet surface (34). A larger part, for example, 90% of the light emitted from the light source (20) is therefore absorbed by the light guide element (31). At the aforementioned maximal admissible curvature a light beam (91) directed toward the outer surface line (39) in light guide element (31) impinges at an angle of 42.2° to the normal at the impingement point and is therefore totally reflected at the interface (33).

In a light unit (10) with a Lambert radiator as light source (20) the ratio of refractive index of the light guide element (31) to refractive index of the immediate surroundings (1) of the light guide element (31) is chosen greater than the square root of two. If the materials in gap (29) and in the remaining environment (1) have different refractive indices, the smaller refractive index ratio should lie above this value. The mentioned limit value of the refractive index ratio is independent of the geometric dimensions of the light inlet surface (34).

If the light source (20) has a smaller radiation angle than the Lambert radiator, the maximal admissible curvature of the light guide element (31) is increased. At the same time the minimal required ratio between refractive indices of the light guide element (31) and its surroundings (1) diminishes.

The maximal admissible curvature of the surface line (39) in such a general design of the light source (20) with a radiation angle $\phi$ is $K_{max}=(S-n_2/n_1)/(h\times S)$, in which $S=(1-(n_2/n_1)^2\times\sin^2(\phi/2))^{1/2}$. The ratio of refractive indices in these cases is greater than or equal to $(\sin^2(\phi/2)+1)^{1/2}$, in which the refractive index of light guide element (31) is higher than the refractive index of the surroundings (1).

With the aforementioned refractive indices and the mentioned length of the light inlet surface, at a radiation angle of light source (20) of 150°, a maximal admissible curvature of the surface line (39) of 11.8×10$^{-3}$/millimeter is obtained. At a radiation angle of 120° 17.5×10$^{-3}$/millimeter is obtained. The minimal required ratio of refractive indices at a radiation angle of 150° is 1.39 and at a radiation angle of 120° 1.32.

The maximal admissible radiation angle of light source (20) at which a maximum of light enters the light guide element (31) and can be totally reflected in it is therefore attained at a refractive index ratio of 1.1 as 54° and at a ratio of 1.3 as 112°.

The cross-sectional surface of the light guide element (31) increases in the practical examples from the light inlet surface (34) to the light outlet surface (36). The light guide element (31) has, for example, four cross-sectional areas (41-44) grading one into the other along its directrix (37). A first cross-sectional plane (41) borders the light inlet surface (34), the fourth cross-sectional area (44) borders the light outlet surface (36). A variant with three or with more than four cross-sectional profiles is also conceivable.

The light inlet surface (34) has a similar shape to the main light outlet surface (24) of the light distribution element (23). In the practical examples both surfaces are circular surfaces in which the diameter of the light inlet surface (34) is, say, 7% greater than the diameter of the main light outlet surface (24). The light inlet surface (34), however, can also be rectangular, oval, elliptical, etc.

In the first cross-sectional area (41) the cross section of light guide element (31) widens, for example, to an oval cross-sectional surface. The length of the small axis in the practical example of this cross-sectional surface (which lies here normal to the cross-sectional plane of FIG. 5) is greater than or equal to the diameter of light inlet surface (34).

In the second (42) and third cross-sectional area (43) of light guide element (31) the shape of the light guide element (31) trends toward wider, for example, oval cross-sectional profiles.

In the fourth cross-sectional area (44) the cross-sectional surface grades into the light outlet surface (36), which has roughly the shape of an oval section. Its width is greater than its height. The lower edge (51) of the light outlet surface (36), cf. FIG. 3, has two sections (52, 53) offset in height relative to each other, which are connected to each other by means of a connection section (54). The sections (52, 53) can enclose with each other an angle of, say, 165° or 135°, for example, without a connection section (54). In this case one of the sections (52; 53) is arranged normal to the plane of directrix (37).

The side surfaces (55) of the fourth cross-sectional area (44) are arranged in mirror image fashion and grade into a cover surface (56) over rounded off longitudinal edges. The bottom surface (61) of the fourth cross-sectional area (44), cf. FIG. 4, includes in these practical examples two curved surface areas (62, 63) offset relative to each other, which are arranged cylindrical. The two surface areas (62, 63) are rotated relative to each other around a common axis. The angle of rotation in these practical examples is 2°, in which the surface area (62) positioned to the left in the light propagation direction (5) extends farther from the light guide element (31) than the surface area (63) positioned to the right. Between the two surface areas (62, 63) a transition area (64) is present in these practical examples. This is arranged here at least roughly in the center along bottom surface (61). It encloses with the adjacent surface area (62, 63) an angle of, say, 135°. The height of the transitional area (64) therefore increases in the light propagation direction (5). In the practical examples depicted in FIGS. 3 and 4 the height of the transitional area (64) at the connection section (54) of the light outlet surface (36) is 0.5 millimeter.

The inside (47) of light guide element (31) facing the center of curvature can enclose a free space (6), as shown in FIGS. 1-3. The inside (47), however, can also carry molded on or fastened support elements, for example, connectors, spokes, or disk-like sections. The light guide element (31) can be fastened in the headlight by means of the support elements. The support elements are not considered part of the light guide element (31) here.

The primary optics (30) includes a primary lens (71) optically connected after the light guide element (31), cf. FIG. 2. This is, for example, a planoconvex aspherical condenser lens (71), for example. By means of this condenser lens (71) the light emerging from light outlet surface (36) can be bundled.

The optical lens can also be formed as an aspherical coupling-out surface on the light guide element (31). The primary optics (30) then has no interface and no gap between the light guide element (31) and the optical lens. The convex surface of the optical lens in this case is part of light outlet surface (36). It can extend downward beyond the lower edge (51). However, it can also be designed so that the bottom surface (61) is continued into the lens.

The secondary optics (80) in the practical example depicted in FIG. 1 includes a secondary lens (81). This is a condensing lens of larger aperture. High efficiency of the optical system is achieved with this.

A light unit without primary lens (71) is shown in FIG. 8 whose secondary lens (81) has the structure of a Fresnel lens. Such a Fresnel lens (82), cf. FIG. 2, permits a small lens thickness with high aperture. At the same time, such a lens (82) can be produced with high process reliability from plastic, since only limited shrinkage occurs because of the limited thickness of lens (82). In the depiction of FIG. 8 the secondary lens (82) has additional indentations (84) in the Fresnel areas (83). An additional scattered light fraction can be deliberately generated with this.

During operation of light unit (10) the light bundle (90) emitted by the light source (20) enters the light guide element (31) as described. With the mentioned geometric conditions the entire light bundle (90) entering light guide element (31) is totally reflected at the interface (33) of the light guide element (31). If however, the maximum actual curvature of the surface line (39) is greater than the admissible maximal curvature, the outer surface (33) of light guide element (31) adjacent to the light inlet surface (34) can be reflected at least in the area of the outer surface line (39) in order to avoid light output in this area.

The light bundle (90) migrates in the light guide element (31) under additional total reflection at interface (33) in the direction of the light outlet surface (36), cf. FIG. 2. The light bundle (90) is fully released from the inside (47) of light guide element (31) and is increasingly added to the area of interface (33) adjacent to surface line (39). The angle of the individual light beams enclosed with a normal at the impingement point becomes greater with increasing distance from light source (20). Light bundle (90) therefore is nestled increasingly closer to the outer periphery of light guide element (31).

The trend of the individual light beams of light bundle (90) is described for example in FIG. 5 by means of two light beams (93) and (94). The light beam (93) is initially totally reflected at the interface (33) in the area of inside (47) and then in the area of light guide element (31) adjacent to the outer surface line (39). The reflection angle in the area adjacent to surface line (39) is smaller than the reflection angle in the area of inside (47). After four additional reflections (the reflection angles become greater with increasing distance from the light inlet surface (34)), no additional reflection curves in the area of inside (47).

The light beam (94) is first reflected on the area of interface (33) comprising the surface line (39). The subsequent reflections also occur on the area of interface (33) including the surface line (39).

On passing through the light guide element (31), the light bundle (90) is formed. A light bundle of higher light intensity is thus formed initially in the radially outer area of light guide element (31), cf. FIG. 2. The product of radiation angle of the bundle and the utilized cross section of the light guide element (31) remains constant. The light intensity of the area of directrix (37) and in the area of inside (47) diminishes.

A detail of the fourth cross-sectional area (44) adjacent to the light outlet surface (36) is shown in FIG. 7. The light bundle (90) in this area lies against bottom surface (61). Here part of the light bundle (90) runs along surface area (62), another part along surface area (63). The area of cover surface (56) of the fourth cross-sectional area (44) remains unilluminated.

On the roadway or on a measurement wall the secondary lens (81; 82) images the z-shaped lower edge (51) of the light outlet surface (36) in the practical example as a sharply formed z-shaped upper light-dark boundary of the illuminated area. If the lower edge is formed with a 15° slope or 45° slope the illuminated area has a corresponding upper limit. In the vicinity of the lower edge (51) an area of higher luminance can be formed by overlapping of light fractions on the light outlet surface (36), which forms a so-called hot spot in the illuminated area. The luminance at the output of the primary optics (30) can therefore be higher than the luminance of the light source (20). The primary optics (30) of the light unit (10) therefore includes the light guide element (31) with variable cross section and curvature, which executes by total reflection a low-loss deflection, redistribution and bundling of the light flux. The described arrangement is largely insensitive to tolerances of LED radiation or positioning of the light source (20).

In the illuminated area, for example, on a measurement wall, the illumination intensity drops to the side and downward continuously. An indistinctly bounded illuminated area free of strips and spots with an upper sharp, z-shaped light-dark boundary is thus obtained to the side and downward.

Use of such a light unit (10) for ambient light distribution is also conceivable.

The described light unit (10) because of its geometric configuration is very efficient and requires only limited space. The absolute coupling efficiency attainable with such a light unit (10) without additional reflections lies at about 80%.

During use of RGB LEDs the individual light fractions are mixed during passing through the light guide so that white light is produced on the light outlet surface (36).

During coupling of, for example, two LEDs, these can be coupled in the first third of the length of the light guide element (31), viewed from the light input side (34). Light losses can therefore be avoided.

A combined light unit (10) for the low beam and high beam is shown in FIG. 9 without light sources. The light unit part (11) for the low beam corresponds here to the light unit depicted in FIGS. 1 to 7. This is arranged on the top in FIG. 9. In order to operate the high beam, a second light unit part (12) arranged beneath the first light part (11) is connected. The two light outlet surfaces (36, 48) of the primary optics (30) are added. The light unit (10) includes a secondary lens (82) that absorbs the light of both light unit parts (11, 12). Such a light unit can also be used exclusively to produce the high beam. In this case the light outlet surfaces (36, 48) of the primary optics grade one into the other free of joints.

LIST OF REFERENCE NUMBERS 1 surroundings
5 light propagation direction
6 free space
10 light unit
11 light unit part
12 light unit part
20 light source
21 luminescent diode, light-emitting diode, LED
22 light-emitting chip
23 light distributing element
24 main light outlet surface
29 gap, air gap
30 primary optics
31 light guide element
32 end surface
33 outer surface, interface of (31)
34 light inlet surface
35 end, facing (80)
36 light outlet surface
37 directrix
38 curved area
39 surface line, longest surface line of (31)
41 first cross-sectional area
42 second cross-sectional area
43 third cross-sectional area
44 fourth cross-sectional area
46 upper edge of (36)
47 inside
48 light outlet surface of (12)
51 lower edge of (36)
52 section of (51)
53 section of (51)
54 connection section
55 side surfaces
56 cover surface
61 bottom surface
62 surface area of (61)
63 surface area of (61)
64 transitional area
71 primary lens, condenser lens
80 secondary optics
81 secondary lens
82 Fresnel lens, secondary lens
83 Fresnel areas
84 indentations
90 light bundle
91-94 light beams

The invention claimed is:

1. Light guide element (31) whose cross-sectional area continuously widens from a light inlet surface (34) to a light outlet surface (36) at least in areas, characterized by the fact that the light guide element (31) includes at least one area (38) with a curved directrix (37), in which the curvature of the directrix (37) is constant in this area (38) or in which the curvature of the directrix (37) diminishes with increasing cross section of light guide element (31) in this area (38), that each line that intersects the light inlet surface (34) penetrates an outer surface (33) of the light guide element (31) outside of the light outlet surface (36) and that the longest surface line (39) bordering the light guide element (31) in the curved area (38) is longer than the difference of pi and double the largest critical angle of total reflection of the material of light guide element (31) relative to the material or materials of the surroundings (1) adjacent to the light guide element (31) divided by the maximal actual curvature of the mentioned surface line (39) of light guide element (31).

2. Light guide element (31) according to claim 1, characterized by the fact that it has at least three cross-sectional profiles (41-44) grading one into the other arranged along directrix (37).

3. Light guide element (31) according to claim 1, characterized by the fact that the radially outward surface (61) of light guide element (31) adjacent to the light outlet surface (36) has two stepped areas or sloped areas (62, 63) relative to each other.

4. Light guide element (31) according to claim 1, characterized by the fact that the light inlet surface (34) is at least roughly a plane surface and that the light outlet surface (36) is plane or arched convexly.

5. Light guide element (31) according to claim 1, characterized by the fact that the maximal curvature of the longest surface line (39) is smaller than the difference from one and the tangent of the critical angle of total reflection of the material of the light guide element against the adjacent surroundings of the light guide element divided by the length of the light inlet surface (34), in which the mentioned curvature and the mentioned length span a common plane.

6. Light guide element (31) according to claim 5, characterized by the fact that the ratio of refractive index of light guide element (31) to refractive index of the surroundings (1) adjacent to light guide element (31) is greater than the square root of two.

7. Light unit (10) with a light source (20), which includes at least one LED (21) with at least one light-emitting chip (22), with at least one light guide element (31) continuously widening at least in areas from a light inlet surface (34) to a light outlet surface (36) in the light propagation direction (5) optically connected after light source (20), characterized by the fact that the light guide element (31) includes at least one area (38) with a curved directrix (37), in which the curvature of the directrix (37) is constant in this area (38) or in which the curvature of the directrix (37) diminishes with increasing cross section of light guide element (31) in this area (38), that each line that intersects the light inlet surface (34) penetrates an outer surface (33) of the light guide element (31) outside of the light outlet surface (36) and that the longest surface line (39) bordering the light guide element (31) in the curved area (38) is longer than the difference of pi and double the largest critical angle of total reflection of the material of light guide element (31) relative to the material or materials of the surroundings (1) adjacent to the light guide element (31) divided by the maximal actual curvature of the mentioned surface line (39) of light guide element (31).

8. Light unit (10) according to claim 7, characterized by the fact that a secondary lens (81; 82) is optically connected after the light guide element (31).

9. Light unit (10) according to claim 7, characterized by the fact that the spacing of the light source (20) to the light inlet surface (34) of the light guide element (31) is smaller than 0.5 millimeter.

10. Light unit (10) according to claim 7, characterized by the fact that the maximal curvature of the surface line (39) is smaller than the difference of S and the ratio of the refractive indices of the surroundings (1) and the light guide element (31) divided by the product of the length of the light inlet surface (34) and S, in which the mentioned curvature and the mentioned length span a common plane and in which S is the square root of one minus the product of the square of the mentioned refractive index ratio and the square of the sine of half the radiation angle of light source (20).

* * * * *